(12) United States Patent
Deguchi

(10) Patent No.: US 7,550,708 B2
(45) Date of Patent: Jun. 23, 2009

(54) PHOTOELECTRIC SENSOR AND EMITTING DEVICE FOR PHOTOELECTRIC SENSOR

(75) Inventor: Tomoki Deguchi, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 12/133,674

(22) Filed: Jun. 5, 2008

(65) Prior Publication Data
US 2009/0001298 A1    Jan. 1, 2009

(30) Foreign Application Priority Data
Jun. 29, 2007    (JP)    ............................. 2007-171666

(51) Int. Cl.
*G06M 7/00*    (2006.01)
(52) U.S. Cl. ..................... 250/221; 250/239; 340/555
(58) Field of Classification Search ................. 250/221, 250/222.1, 239; 340/555–557; 362/275, 362/276, 295
See application file for complete search history.

(56) References Cited
U.S. PATENT DOCUMENTS

| | | | |
|---|---|---|---|
| 5,003,169 A | 3/1991 | Sakaguchi et al. | |
| 6,111,995 A | 8/2000 | Iwasaki et al. | |
| 6,140,633 A * | 10/2000 | Iwasaki et al. | 250/221 |
| 6,774,352 B2 * | 8/2004 | Koyama et al. | 250/221 |
| 7,122,782 B2 | 10/2006 | Sakaguchi | |

FOREIGN PATENT DOCUMENTS

| | | |
|---|---|---|
| JP | 64-089230 | 4/1989 |
| JP | 02-135630 | 5/1990 |
| JP | 02-135631 | 5/1990 |
| JP | 02-135632 | 5/1990 |
| JP | 10-074432 | 3/1998 |

(Continued)

*Primary Examiner*—Kevin Pyo
(74) *Attorney, Agent, or Firm*—Kilyk & Bowersox, P.L.L.C.

(57) ABSTRACT

A purpose of the present invention is to provide a photoelectric sensor and an emitting device for a photoelectric sensor which can improve resistance to liquids. A purpose of the present invention is also to provide a photoelectric sensor and an emitting device for a photoelectric sensor which can improve productivity.

According to the present invention, a main casing is described in which a plurality of photoelectric elements are included along a first direction; a first opening formed on the main casing for passing through a light corresponding to the photoelectric element between the inside and outside of the main casing; a transparent plate affixed on a pair of first surfaces of the main casing so as to cover the first opening, for passing through the light between the inside and outside of the main casing; a first adhesive member disposed between the transparent plate and the pair of first surfaces, for affixing the transparent plate on the pair of first surfaces; a pair of projections formed on the main casing along the first direction, outstanding along to an optical axis of the light, and disposed apart from each other whereby the transparent plate is accessible from the outside of the main casing to the pair of first surfaces; a pair of channels formed on the main casing along the first direction and between the pair of first surfaces and the pair of projections of the main casing; and a pair of first pressing members fixed in the pair of channels and contacting an opposite side of the surface where the transparent plate is located, for pressing the transparent plate to the main casing.

7 Claims, 7 Drawing Sheets

FOREIGN PATENT DOCUMENTS

| | | |
|---|---|---|
| JP | 11-329179 | 11/1999 |
| JP | 11-329181 | 11/1999 |
| JP | 2001-155597 | 6/2001 |
| JP | 2002-056753 | 2/2002 |
| JP | 2002-075149 | 3/2002 |
| JP | 2003-016891 | 1/2003 |
| JP | 2003-037284 | 2/2003 |
| JP | 2004-179031 | 6/2004 |
| JP | 2004-227798 | 8/2004 |
| JP | 2004-311384 | 11/2004 |
| JP | 2005-321198 | 11/2005 |
| JP | 2006-155902 | 6/2006 |

* cited by examiner

PHOTOELECTRIC SENSOR AND EMITTING DEVICE FOR PHOTOELECTRIC SENSOR

CROSS-REFERENCE TO RELATED APPLICATION

The present application claims priority from Japanese Patent Application No. 2007-171666, filed on Jun. 29, 2007, the entire contents of which are hereby incorporated by reference.

BACKGROUND OF THE INVENTION

1. Field of the Invention

The present invention relates to a photoelectric sensor and an emitting device for the photoelectric sensor. More particularly, the present invention relates to an improvement in structure of a photoelectric sensor having a transparent plate for passing through detection light and a casing holding an optical element irradiating or receiving the detection light, such as a photoelectric element or an emitting element.

2. Description of Related Art

Some photoelectric sensors have an optical element such as a photoelectric element and an emitting element; a main casing holding the optical element; a transparent plate coupled to the main casing; and for passing through a light related to the optical element. Japanese Laid-Open Patent No. 2001-155597 shows a structure for affixing the transparent plate to the main casing with a slide action.

According to conventional technology shown in the Japanese Laid-Open Patent, a sealing member such as a gasket is not installed between the main casing and the transparent plate which can slide on the main casing so as to be affixed on the main casing. Therefore, liquid, i.e. water and oil, is likely to leak in the main casing through a gap between the main casing and the transparent plate. The leakage is likely to damage the sensor.

For example, in the case where the sensors are installed in a product line, oil utilized in a processing machine may spread on the sensors. Then, the oil is likely to leak into the sensors. If the sensors installed in the product line fail due to the leakage of the oil, the operation of the product line is generally suspended until the failed sensors are replaced. This suspended time of the product line causes lower productivity. Moreover, even though the suspended time may be short, safety confirmation for restarting the product line may take a longer time. Thus, suspension of the product line causes reducing productivity.

Ring gaskets might be installed at the surroundings of the openings which are covered by a transparent plate so as to avoid leaking of liquid inside of the sensor. However, since the opening shape depends on the size of the sensor, various sizes of gaskets should be prepared in accordance with the size of the sensor. In the case of a multi-axis photoelectric sensor, the sensor should be prepared for various detection lengths so as to comply with various applications. So, in situation, the main casings of the sensors are made by cutting longitudinal pipe to desirable length. In this manner, it's easy to produce sensors having various detection lengths. But since the shape of the gasket is a ring, the above manner can not be adapted for producing the ring gaskets. Therefore, various sizes of ring gaskets should be prepared corresponding to the desire lengths of the main casings. Consequently, productivity is reduced.

One might consider using adhesive tape that is bonded along the opening instead of the gasket where a transparent plate is held by the adhesive tape. However, it may be difficult to place the adhesive tape between the main casing and the transparent plate because of the structure for sliding the transparent plate on the main casing to unit each other.

SUMMARY OF THE INVENTION

The above-described problems associated with the prior art photoelectric sensor are believed solved by the present invention. Specially, a purpose of the present invention is to provide a photoelectric sensor and an emitting device for a photoelectric sensor which can improve resistance to liquids. A purpose of the present invention is also to provide a photoelectric sensor and an emitting device for a photoelectric sensor which can improve productivity.

According to the present invention, a main casing is described in which a plurality of photoelectric elements are included along a first direction;

a first opening formed on the main casing for passing through a light corresponding to the photoelectric element between the inside and outside of the main casing;

a transparent plate affixed on a pair of first surfaces of the main casing so as to cover the first opening, for passing through the light between the inside and outside of the main casing;

a first adhesive member disposed between the transparent plate and the pair of first surfaces, for affixing the transparent plate on the pair of first surfaces;

a pair of projections formed on the main casing along the first direction, outstanding along to an optical axis of the light, and disposed apart from each other whereby the transparent plate is accessible from the outside of the main casing to the pair of first surfaces;

a pair of channels formed on the main casing along the first direction and between the pair of first surfaces and the pair of projections of the main casing; and a pair of first pressing members fixed in the pair of channels and contacting an opposite side of the surface where the transparent plate is located, for pressing the transparent plate to the main casing.

DETAILED DESCRIPTION OF THE PREFERRED EMBODIMENTS

Figure 1:
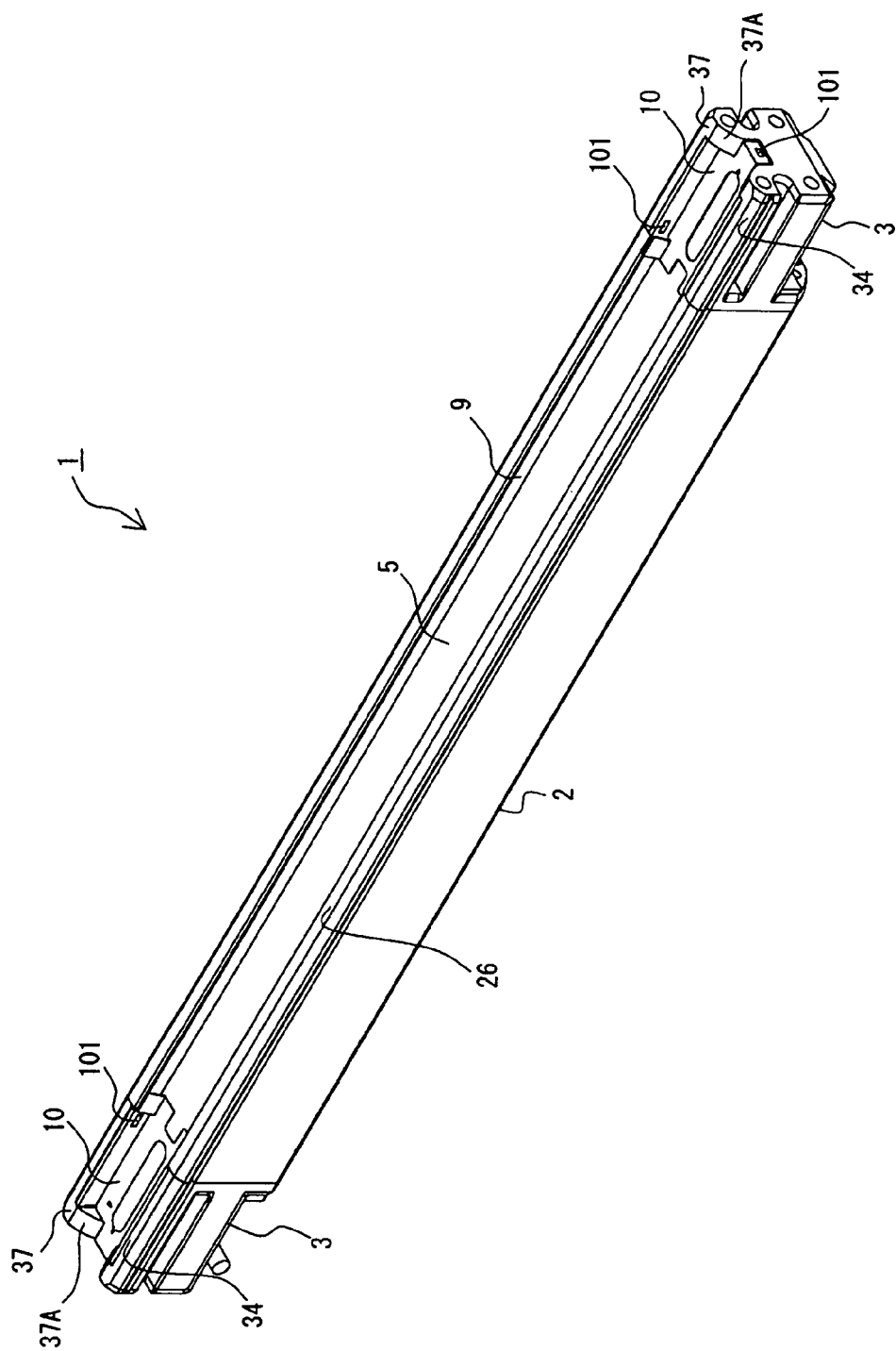
FIG. 1 shows a perspective view of a photoelectric sensor according to the present invention.
Figure 2:
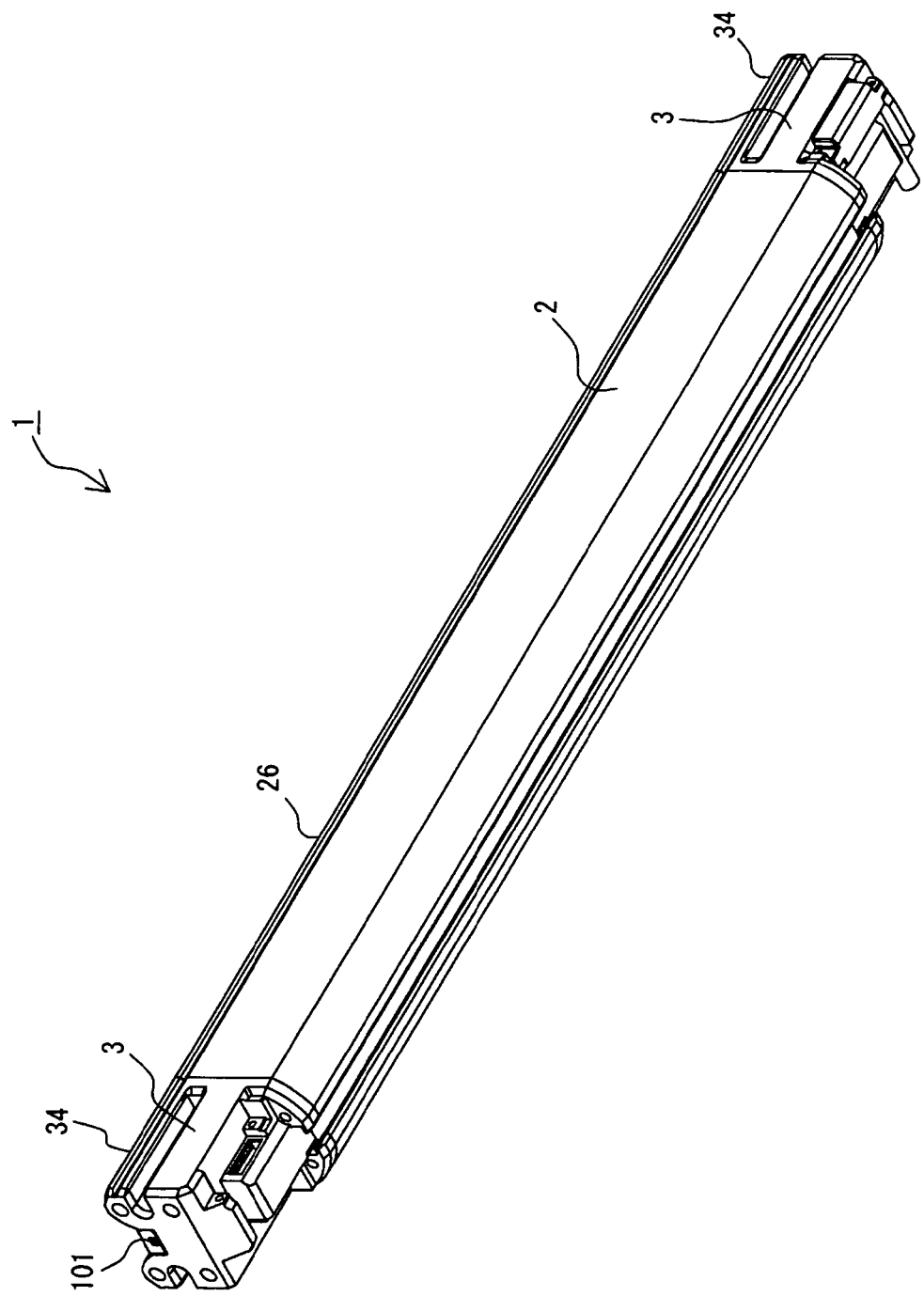
FIG. 2 shows a perspective view of a photoelectric sensor shown in FIG. 1 in view from bottom.
Figure 3:
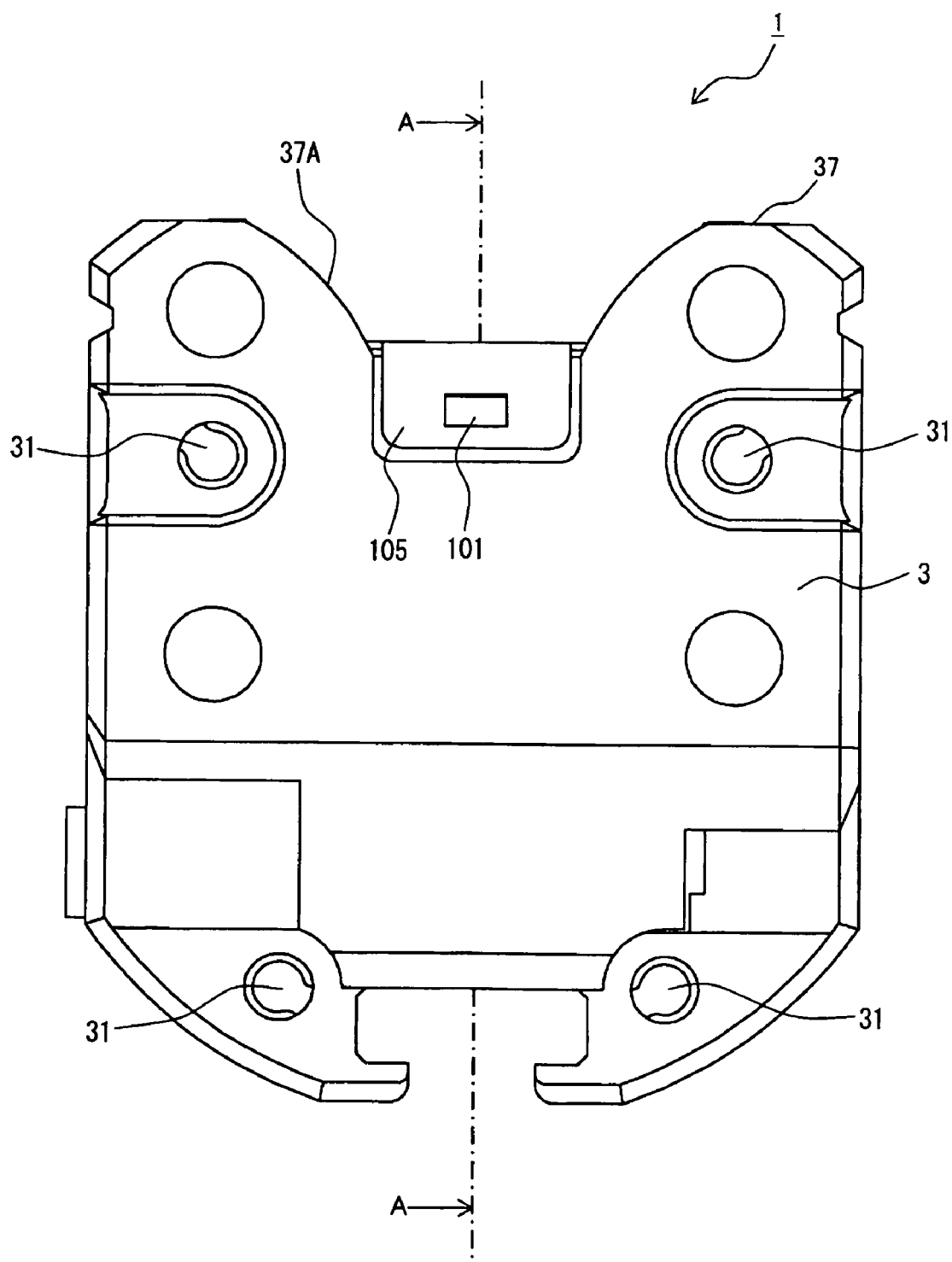
FIG. 3 shows a side view of a photoelectric sensor shown in FIG. 1.
Figure 4:
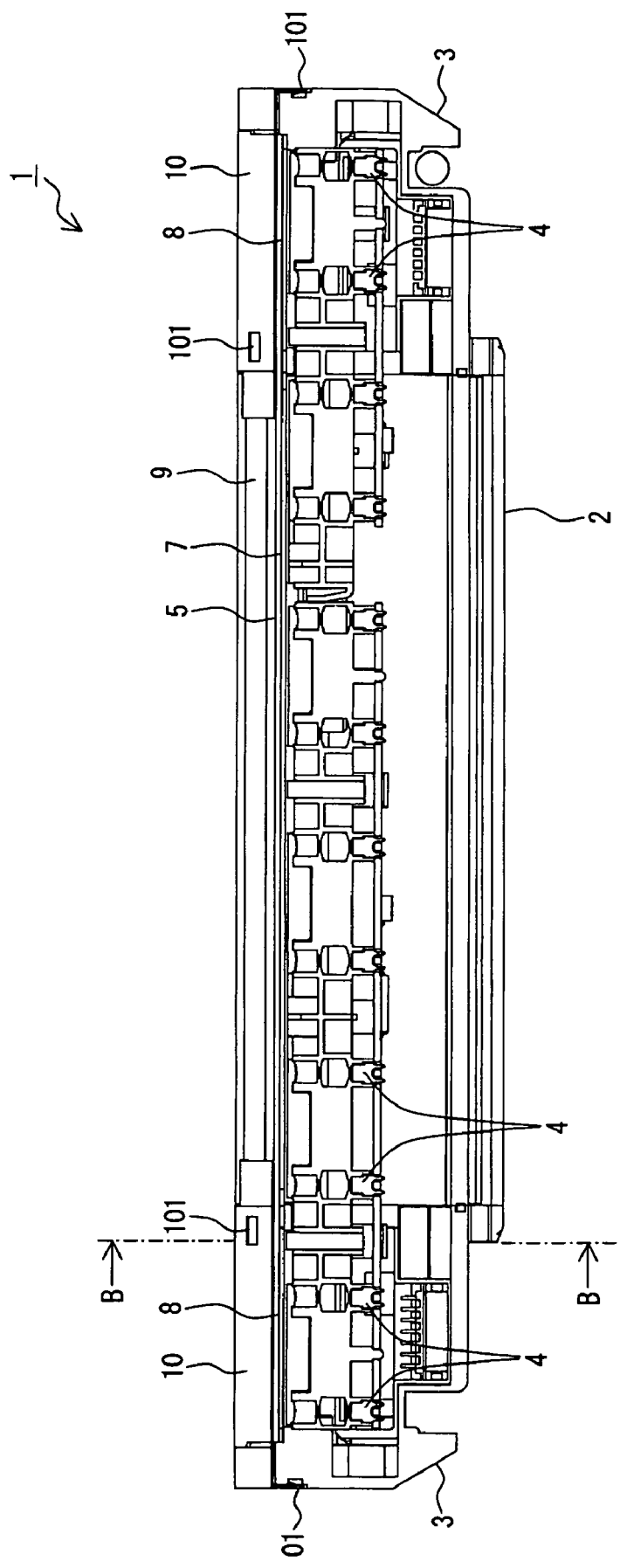
FIG. 4 shows a cross sectional view along the A-A line of a photoelectric sensor shown in FIG. 3.
Figure 5:
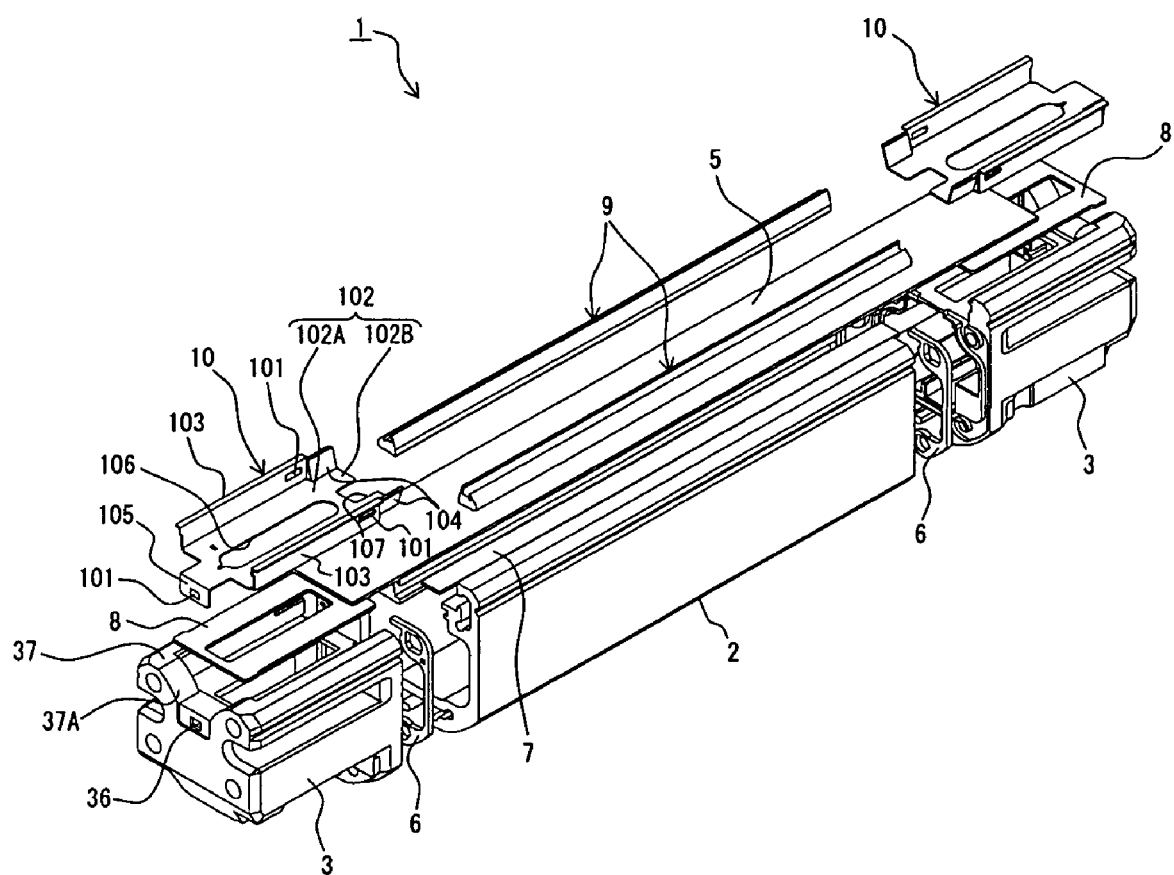
FIG. 5 shows an exploded perspective view of a photoelectric sensor in view from top.

FIG. 1 shows a perspective view of a photoelectric sensor 1 according to this embodiment. FIG. 2 shows a perspective view of the photoelectric sensor 1 as shown in FIG. 1 from an opposite side of FIG. 1. FIG. 3 shows a side view of the photoelectric sensor 1 as shown in FIG. 1. FIG. 4 shows a cross sectional view along the A-A line of the photoelectric sensor as shown in FIG. 3. FIG. 5 shows an exploded perspective view of the photoelectric sensor 1 as shown in FIG. 1. In this description, directions are defined as follows except where otherwise indicated. Direction "left" is defined as left shown in FIG. 3 on the basis of the attitude of the photoelectric sensor 1, direction "right" is defined as right shown in FIG. 3 on the basis of the attitude, direction "front" is defined as left shown in FIG. 4 on the basis of the attitude, and direction "back" is defined as right shown in FIG. 4 on the basis of the attitude.

The photoelectric sensor 1 has a main casing 2 elongated along a first direction and a pair of end casings 3 coupled to both ends of the elongated main casing 2. The main casing 2 can be made of metal such as aluminum and can be made by using an extruder. On the other hand, the end casing 3 can be made of metal such as zinc alloy and can be made by die casting. In the alternative, the end casing 3 may be made of resin and may be made by injection molding. An optical element 4 such as a photoelectric element and an emitting element is installed in the main casing 2 and the end casings 3. A single rectangular transparent plate 5 is coupled over the front surfaces of both the main casing 2 and the end casings 3.

The transparent plate 5 can be made of glass or the like so as to allow a light related to the optical element 4 to pass through and between the outside and the inside of both the main casing 2 and the end casings 3. In other word, the photoelectric element as the optical element 4 provides an electrical signal corresponding to the amount of receiving light which passes through the transparent plate 5. On the other hand, the emitting element as the optical element 4 emits light to the outside of the casings through the transparent plate 5. In this embodiment, a plurality of photoelectric elements as the optical elements 4 are arranged at regular intervals in a line along the first direction.

The photoelectric sensor 1 may include an emitting device in which a plurality of emitting elements as the optical element 4 are arranged at regular intervals in a line along the elongated direction of the main casing 2, and a receiving device, which has substantially the same outline shape as the emitting device, in which a plurality of photoelectric elements as the optical element 4 are arranged at the regular intervals in a line along the elongated direction of the main casing 2. The emitting device and the receiving device are arranged so that each of the plurality of emitting elements in the emitting device irradiates light to a detection area, and each of the plurality of photoelectric elements receives the light corresponding to each of the plurality of emitting elements from the detection area. Thus, a plurality of optical axes, namely light curtain, are formed in the detection area by the emitting device and the receiving device. Such photoelectric sensors 1 are so-called a multi-axis photoelectric sensor, and detect interruption of either optical axes due to existence of an object in the detection area or intrusion of an object in the detection area.

In assembling the photoelectric sensor 1, the plurality of optical elements 4 are arranged in the main casing 2, then the end casings 3 are coupled to both ends of the main casing 2 with a gasket 6 (referring to FIG. 5) made of an elastic material such as a rubber or an elastic polymer. In this manner, the plurality of optical elements 4 are installed in the inside of the photoelectric sensor 1. In this embodiment, four screw holes are formed on the coupling side surfaces of the end casings 3. A fastener such as a screw is inserted in each of the four holes on the respective end casing 3 so that respective end casing 3 is fixed to both ends of the main casing 2.

After the main casing 2 and the pair of end casings 3 are coupled to each other in this manner, double-sided adhesive tapes 7, 8 (referring to FIG. 5) are mounted on the front surfaces of the main casing 2 and the end casings 3. The transparent plate 5 covers over the front surfaces of the main casing 2 and the end casing 3 with the double-sided adhesive tapes 7, 8, and then, the transparent plate 5 is bound to the main casing 2 and the end casings 3. In this embodiment, the adhesive tape 7 mounted on the main casing 2 is a first adhesive member elongating from one end of the main casing 2 to the other in a line along the first direction, that is, along an arranging direction of the plurality of optical elements 4. On the other hand, the adhesive tape 8 mounted on the end casings 3, are a ring-shaped second adhesive member corresponding to the outer edge of the mounting surfaces of the end casings 3.

A pressing member 9 is attached to the main casing 2 in order to press front surface of the transparent plate 5 to the back direction. The pressing member 9 elongates from one end of the main casing 2 to the other in a line along the first direction, and is formed of, for example, an elastic material such as a rubber or an elastic polymer. The pressing member 9 corresponds to the shape to the adhesive tape 7, and is mounted on the front surface of the transparent plate 5. In other words, the pressing member 9 is fixed so as to press the transparent plate 5 toward the inside of the main casing 2 along an optical axis of the optical element 4.

On the other hand, on the end casings 3, a pressing member 10 is attached in order to press the front surface of the transparent plate 5 toward the front surfaces of the end casings 3. The pressing member 10 is a second pressing member having a ring shape which is formed along the outer edge of the front surfaces of the end casings 3, and is formed of, for example, a metal plate. The pressing member 10 corresponds to the shape to the adhesive tape 8, and the pressing member 10 is fixed so that the transparent plate 5 is mounted between the adhesive tapes 8 and the pressing member 10.

Figure 6:
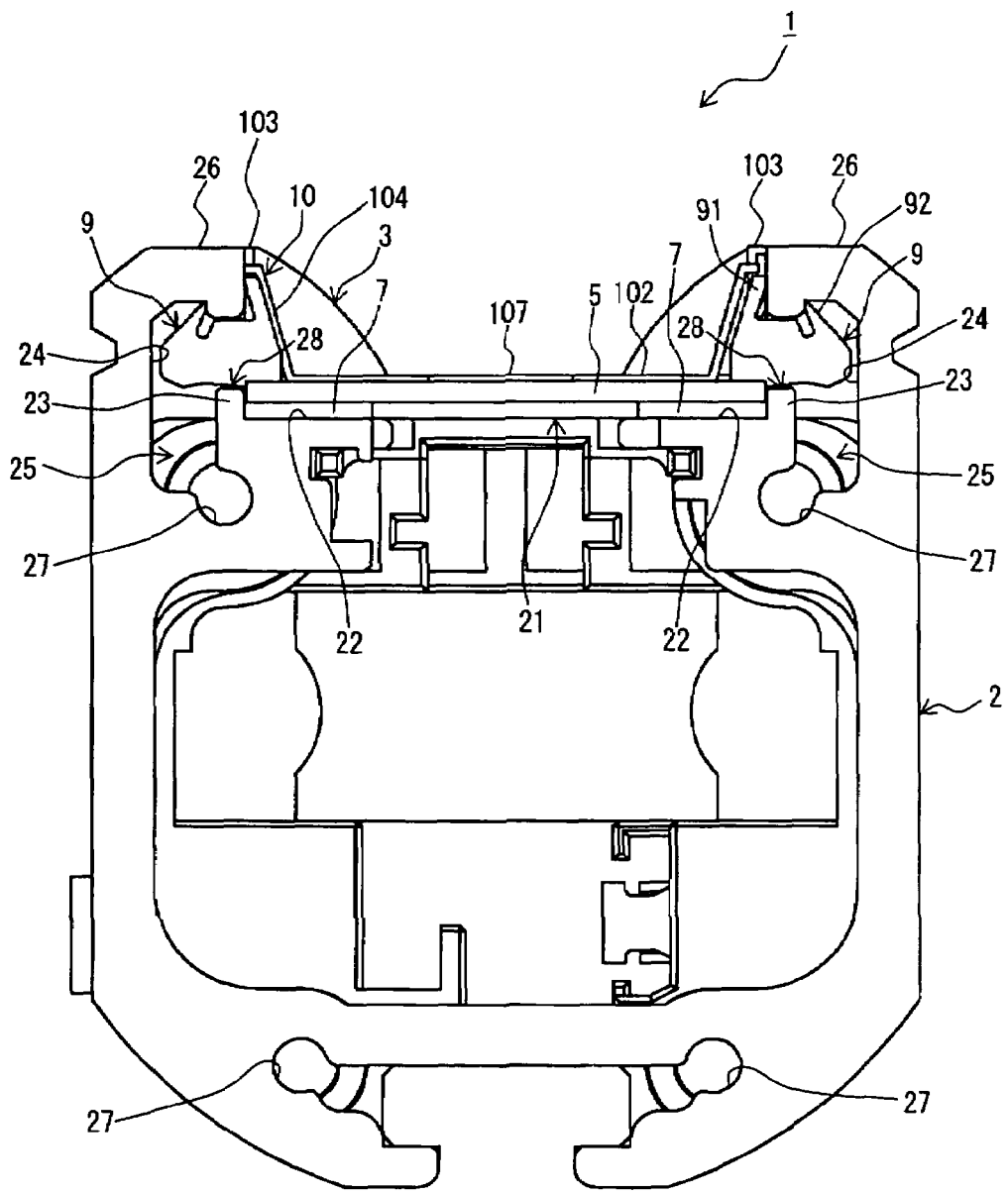
FIG. 6 shows a side view of a main casing in view from a end side, and the main casing has an end member at another end side.

FIG. 6 shows a side view of the main casing 2 from one end of the elongated photoelectric sensor 1. FIG. 6 shows that the end casing 3 is coupled to the other end of the main casing 2. As shown in FIG. 6, on a front surface of the main casing 2, a first opening 21 is formed in order for the light to pass through and between the inside and outside of the main casing 2. The first opening 21 is elongated from one end to the other end of the main casing 2 along the first direction. In the emitting device, the first opening 21 allows the light irradiated from the emitting element as the optical element 4 to pass through to outside of the main casing 2. In the receiving device, the first opening 21 allows the light inputted from outside of the main casing 2 to pass through to the photoelectric element as the optical element 4.

A pair of first mounting surfaces 22 is formed on both left and right sides of the first opening 21 in the front surface of the main casing 2 and is formed from one end to the other of the main casing 2 along the first direction, that is, on both sides of the first opening 21 along a direction perpendicular to both an arrangement direction of the plurality of optical elements 4 and the optical axis of the optical element 4. Each pair of first mounting surfaces 22 is formed in a plane. Thus, in this manner of mounting adhesive tapes on the pair of first mounting surfaces 22 and mounting the transparent plate 5 on the adhesive tapes, the transparent plate 5 is affixed on the pair of first mounting surfaces 22 so that the transparent plate 5 can cover the first opening 21.

Walls 23 projecting to the front side of the main casing 2, are formed at the outer edges of the pair of first mounting surfaces 22 along the first direction, that is, the walls 23 are formed at a left edge of the left first mounting surface 22 and a right edge of the right first mounting surface 22. The walls 23 are formed in parallel to each other, and a distance between the walls 23 corresponds to the width of the transparent plate 5 in the left and right direction of the main casing 2. Therefore, when the transparent plate 5 is affixed on the pair of first mounting surfaces 22 via the pieces of adhesive tape 7, the transparent plate 5 can be disposed between the walls 23 side by side. Therefore, the walls 23 can avoid shifting of the transparent plate 5 in the left and right direction of the main casing 2.

A pair of hollow portions 25 and a pair of first projections 26 are formed at the outside of the pair of walls 23 by a continuous surface 24 including a bended part or a curved part, that is, the pair of hollow portions 25 and the pair of first projections 26 are formed at a left side of the left wall 23 and a right side of the right wall 23. The hollow portion 25 is disposed at a back position relative to the first mounting surface 22. The projection 26 projects so that the front end of the projection 26 reaches to the front position relative to the wall 23. A groove 27 shaped cylinder is formed of a linear shape by the continuous surface 24 at each back side portion of the pair of hollows 25 along the first direction. At both ends of the grooves 27, fasteners inserted into holes 31 (referring to FIG. 7) are engaged so that each end casing 3 is joined to the main casing 2. In case where a screw is utilized as the fastener, an internal thread is formed at both ends of the grooves 27.

Such grooves 27 do not include only two grooves 27 formed on a front half of the main casing 2, but the grooves 27 also include two grooves 27 formed on a back half of the main casing 2. In other words, at the back half of the main casing 2, a hollow is formed by a continuous surface, and is depressed toward the front side. At front portions of the hollow, the grooves 27 have a cylindrical shape and are formed to linear shape along the first direction.

The pair of first projections 26 face each other in the right and left direction. Each of the pair of projections 26 projects toward the front side, and each front end of the pair of projections 26 bends to the inside at an approximate right angle and projects toward each other. In other words, each of the pair of projections 26 is formed to an approximate L shape. The front ends of the pair of first projection 26 projects toward each other and reaches up to each position corresponding to the walls 23 along the right and left direction. A pair of channels 28 is formed by each of the walls 23 and each front end of the projections 26 corresponding to each wall 23. The pair of channels 28 face each other. A pressing member 9 is engaged at each channel 28. In this embodiment, the continuous surface 24 does not form only the channel 28, but also the groove 27 to which the fastener is inserted so as to join the end casing 3 to the main casing 2. So the channel 28 and the groove 27 can be formed in a single process. As a consequence, productivity is significantly improved.

On a front surface of each pressing member 9, a first contacting portion 91 and a second contacting portion 92 are formed. The first contacting portion 91 projects toward the front side along the front end of the first projection 26. The second contacting portion 92 projects toward the front side and contacts at the opposite surface of the front end of the first projection 26 against the first contacting portion 91. The first contacting portion 91 reaches the front position relative to the second contacting portion 92. When each pressing member 9 is engaged at the channel 28 corresponding to the pressing member 9, a back side surface of the pressing member 9 contacts the front end of the wall 23, a front side surface of the pressing member 9 contacts the front end of the first projection 26, and both the first contacting portion 91 and the second contacting portion 92, which are formed on the front side surface of the pressing member 9, contact at the front end of the first projection 26. In such the case, the back side surface of each pressing member 9 contacts the right and left edge portion of the transparent plate 5. Thus, the pressing member 9 presses the transparent plate 5 toward the back direction.

In this embodiment, pieces of adhesive tape are mounted on the pair of first mounting surfaces 22 between which the first opening 21 for passing through the light is disposed. Then, the transparent plate 5 inserted through space between the pair of first projections 26, can be affixed on the adhesive tape 7. A distance between the pair of first projections 26 corresponds to the width of the transparent plate 5 in the right and left directions. The distance between the pair of first projections 26 may be set to be slightly wider than the width of the transparent plate 5. Therefore, since the transparent 5 can be inserted from front side toward the back direction of the main casing 2, it is easy to affix the transparent plate 5 on the main casing 2 via the adhesive tape. Moreover, each pressing member 9 is engaged at the pair of channels 28, and then, the opposite surface of the surface facing the first mounting surface 22 of the transparent plate 5, can be contacted and pressed by the pressing member 9. As the result, it can avoid stripping the adhesive tape off. Therefore, the adhesive tape 7 and the pressing member 9 can avoid having liquid leak through the first opening 21, and can improve tolerance of the photoelectric sensor 1.

The adhesive tape and the pressing member 9 may be mounted on the pair of the first mounting surfaces 22 between which the first opening 21 is located. As a result, the transparent plate 5 can be affixed on the pair of first mounting surface 22. Therefore, the adhesive tape 7 and the pressing member have a linear structure along the first direction, so they can made by cutting to any desirable length from the elongated material instead of preparing various kinds of ring shaped gaskets in the conventional technology As a consequence, productivity is significantly improved.

Moreover, since the first projection 26 projects toward the front direction and reach the front position relative to the transparent plate 5, the transparent plate 5 can be protected by the first projection 26. As a consequence, the strength of the photoelectric sensor 1 is significantly improved.

Figure 7:
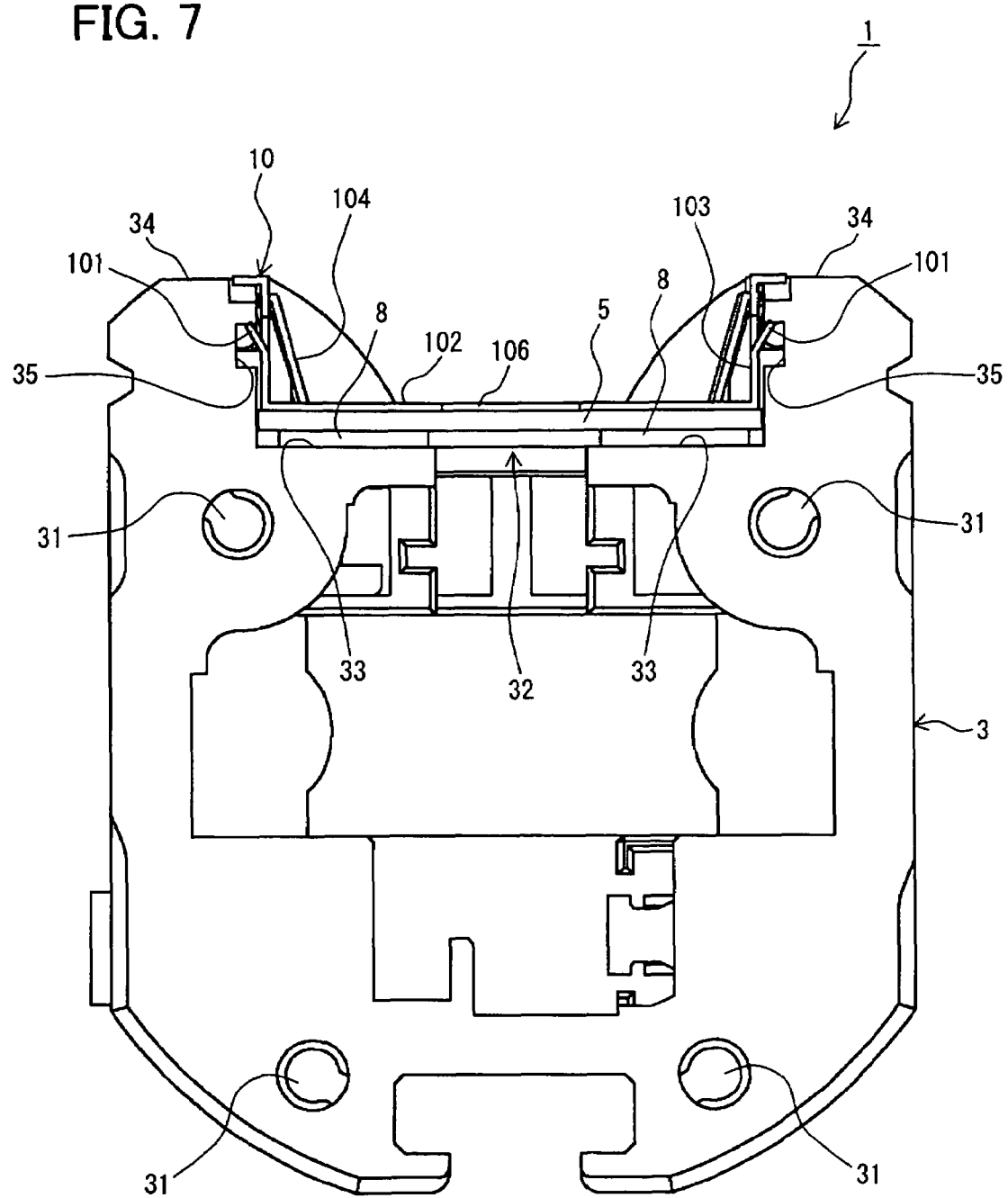
FIG. 7 shows a cross sectional view along the B-B line of a photoelectric sensor shown in FIG. 4.

FIG. 7 shows a cross-sectional view of the photoelectric sensor 1 according to FIG. 4 along the line of B-B. As shown in FIG. 7, on the front surface of the end casing 3, a second opening for passing through light between the outside and inside of the end casing 3, is formed. The second opening 32 elongates from one end to the other end of the end casing 3. In the emitting device, light irradiated from the emitting element as the optical element 4, can be passed through to the outside. In the receiving device, light from the outside can be passed through to the photoelectric device in the end casing 3.

On a front surface of the end casing 3, a second mounting surface 33 is formed to a ring shape which surrounds the second opening 32. On the second mounting surface 33, an adhesive tape is mounted. Then, the transparent plate 5 is mounted on the adhesive tape. Consequently, the transparent plate 5 is affixed on the second surface 33 so that the transparent plate 5 covers the second opening 32.

A pair of second projections is formed of a linear shape on right and left edges on the second mounting surface 33 along the first direction. The second projections 34 are disposed paralleled to each other. Distance between the second projections 34 corresponds to the width of the transparent plate 5 in the right and left directions. Therefore, when the transparent plate 5 is affixed on the pair of second mounting surfaces 33 via the adhesive tape 8, the transparent plate 5 is disposed between the pair of second projections 34, and each of the second projections 34 prevent the shifting of the transparent plate 5 in the right and left direction.

The pair of second projections 34 projects toward the front direction and reaches to the same level as the pair of first projections 26. When each of the end casings 3 is joined to the main casing 2, the pair of second projections 34 is disposed continuously with the first projections 26 corresponding to the second projections 34, and is elongated in the same line as each of the first projections 26. As a result, in the end casing 3, the pair of second projections 34 which is adjacent to the first projections 26 and elongated in the same line, can protect the transparent plate 5. As a consequence, the strength of the photoelectric sensor 1 is significantly improved.

A hole 35 adapted for engaging a pressing member 10, is formed on surfaces facing each other, of the pair of second projections 34. A hole 36 adapted for engaging a pressing member 10, is formed on the front half of the end surface in the end casing 3 (referring to FIG. 5). In the pressing member 10, three engaging portions 101 which corresponds to each of the holes 35 and 36, are formed. The pressing member 10 can be engaged to the end casing 3 by engaging the engaging portions 101 to the holes 35 and 36.

In such a case, the pressing member 10 can be made of bended metal plate, and can include a main plate portion 102 which contacts the front surface of the transparent plate 5; a first side plate portion 103 and a second side plate portion 104 which project toward the front direction at both edges of the main plate portion 102 in the right and left directions; and a third side plate portion 105 which projects toward the back direction at the end edge of the main plate portion 102. The main plate portion 102 has a first region 102A (referring to FIG. 5) for covering the end casing 3, and a second region 102B for covering the main casing 2. In more detail, the first region 102A covers the front surface of the end casing 3, and the second region 102B covers edge portion of the front surface of the main casing 2.

Referring to FIG. 5, on the first region 102A of the main plate portion 102, an aperture 106 elongating along the first direction, is formed at the center of the first region 102A. The first region 102A is formed to a ring shape corresponding to the adhesive tape 8. Therefore, when the pressing member 10 is attached to the transparent plate 5, the elongated aperture 106 allows the optical element 4 in the end casing 3 to transfer light to be detected between the inside and outside of the end casing 3. On the second region 102B of the main plate portion 102, a hollow portion 107 is formed. The hollow portion 107 has a shape which is setback from the center portion of the edge of the main casing 2 toward the end casing 3. Therefore, in the case where the pressing member 10 is attached on the transparent plate 5, the optical element 4 disposed in the edge portion of the main casing 2 can transmit the light through the hollow portion 107.

Each of the first side plate portions 103 is formed by bending of both right and left edges of the first region 102A in the main plate portion 102 at the approximately right angles, and projects toward the front side. Two of the three engaging portions 101 are formed at an edge portion of the main casing 2 side on the first side plate portion 103. In more detail, an incision is formed on each first side portion 103 so as to form the two engaging portions 101. A part of each of the two engaging portions 101 is separated from the respective first side plate portion 103 by the incision, and each of the two engaging portions 101 is bent to the outside. When the pressing member 10 is attached on the end casing 3, a front end portion of the bended part contacts to an internal surface of the hole 35 corresponding to the bended part.

A front end portion of each of the first side portion 103 is bent to the outside. In the case where the pressing member 10 is attached on the end casing 3, the bended part contacts an end portion of the first contacting portion 91. As a result, the present embodiment can avoid liquid leaking between the first side portion 103 and the second projection 34. Thus, tolerance for preventing the leaking of liquid can be improved.

Each of the second side plate portion 104 projects toward the front, and inclines for and the outside at both of right edge of the second region 102B and left edge of the second region 102B in the main plate portion 102. When the pressing member 10 is attached on the end casing 3, the outer surface of each second side portion 104 contacts an edge portion of the pressing member 9 which is fixed on the main casing 2, and presses the edge portion of the pressing member 9 to the outside. A front end of each of the second side plate portion 104 is bent to the outside. When the pressing member 10 is attached to the end casing 3, the bended end portion contacts a front end of the first contacting portion 91 at the end portion of the pressing member 9 which faces the bended end portion. As a result, the present embodiment can avoid the unfastening of the end portion of the pressing member 9 from the channel 28.

The third side plate portion 105 projects toward the back side and perpendicularly at the extreme end edge of the main plate portion 102. One of the three engaging portions 101 is formed at the center of the third side plate portion 105. The engaging portion 101 is formed as a bended part at the third side plate portion 103 by forming an incision. The bended part is a part of the third side plate portion 105 which is bent to the inside. When the pressing member 10 is attached on the end casing 3, the bended part contacts an inside of the hole 36 corresponding to the bent part.

In the present embodiment, to both end portions of the main casing 2, the end casings 3 in which the optical element 4 is installed in the same manner as the main casing 2, is joined. Therefore, in the photoelectric sensor 1 having the main casing 2 and the end casing 3 joined at both ends of the main casing 2, the optical elements 4 are arranged from one end to the other end. As a consequence, the photoelectric sensor 1 is significantly downsized. Moreover, in the end casings 3, the leakage of liquid into the second opening 32 can be avoided by the adhesive tape 8 and the pressing member 10. Thus, the tolerance of the photoelectric sensor 1 is significantly improved.

Because the end casings 3 are joined at both ends of the main casing 2, the photoelectric sensor 1 can be formed to any desired length by forming the main casing 2 to a desired length and joining the end casings 3 to the main casing 2. Thus, it is not necessary to change the length of the end casing 3, but the adhesive tape 8 and the pressing member 10 can be formed to the same sectional shape. So, productivity can be improved.

In this embodiment, the transparent plate 5 is affixed to the second mounting surface 33 of each end casing 3 via the adhesive tape. Then, the pressing member 10 is inserted from the front side to each end casing 3, and three engaging portions 101 formed on the pressing member 10 are engaged at holes 35, 36 corresponding to each engaging portion 101. Therefore, the transparent plate 5 can be fixed by using the pressing member 10 which presses the opposite surface of mounting surface of the transparent plate 5. In other words, it is easy to attach the pressing member 10 which engages with the engaging portions 102 only by inserting the pressing member 10 from the front side onto the end casing 3. Therefore, productivity can be improved.

In the present embodiment, the third projection 37 which projects toward the front side along the extreme end edge of the end casings 3 is formed on the end casings 3. The third projection 37 extends perpendicular to the extending direction of the second projections 34, and reaches to the same level as the height of the second projections 34. On the center portion of the third projection 37, notch 37A is formed from the front end to the back end of the third projection 37. When the pressing member 10 is attached on the end casings 3, the pressing member 10 can contact the backside of the notch 37A.

Consequently, in the end casings 3, the transparent plate 5 can be protected by not only the pair of second projections 34 but also the third projection 37. Thus, the strength of the photoelectric sensor 1 can be improved. In the case where the photoelectric sensor 1 is used in a situation where the front surface of the photoelectric sensor 1 faces upwind, the notch 37A can drain liquid out from the front surface of the photoelectric sensor 1. As the result, the tolerance can be improved.

As shown in FIGS. 6 and 7, an interval between the pair of first projections 26 and an interval between the pair of second projections 34 corresponds to the width of the transparent plate 5 respectively in the right and left direction. Therefore, the transparent plate 5 which is parallel to the first mounting surface 22 and second mounting surface 33, can be inserted from the outside onto the main casing 2 and the end casings 3 through the interval of the pair of first projections 26 and the pair of second projections 34. Then, the transparent plate 5 can be affixed on the first mounting surface 22 and the second mounting surface 33.

However, the scope of the present invention is not limit to the above mentioned embodiments. For example, an interval between the pair of first projections 26 and an interval between the pair of second projections 34 may be wider than the width of the transparent plate 5 respectively in the right and left directions. In contrast, the intervals may be closet than the width of the transparent plate 5. In the case where the interval between the pair of first projections 26 and the interval between the pair of second projections 34 are closer than the width of the transparent plate 5, the transparent plate 5 which is inclined to the first mounting surface 22 and second mounting surface 33, can be inserted from front side onto the first mounting surface 22 and second mounting surface 33.

As an embodiment, photoelectric sensors 1 having a photoelectric element and an emitting element are described. The present invention is applicable to any photoelectric sensor having a photoelectric sensor, and an emitting device for a photoelectric sensor having an emitting element.

The invention claimed is:

1. A photoelectric sensor having a photoelectric element which generates an electrical signal corresponding to amount of receiving light, the photoelectric sensor comprising:
    a main casing in which a plurality of photoelectric elements are included along a first direction;
    a first opening formed on the main casing for passing through a light corresponding to the photoelectric element between an inside and outside of the main casing;
    a transparent plate affixed on a pair of first surfaces of the main casing so as to cover the first opening, for passing through the light between the inside and outside of the main casing;
    a first adhesive member disposed between the transparent plate and the pair of first surfaces, for affixing the transparent plate on the pair of first surfaces;
    a pair of projections formed on the main casing along the first direction, projecting along an optical axis of the light, and disposed apart from each other whereby the transparent plate assembles from the outside of the main casing to the pair of first surfaces;
    a pair of channels formed on the main casing along the first direction and between the pair of first surfaces and the pair of projections of the main casing; and
    a pair of first pressing members fixed in the pair of channels and contacting an opposite side of the affixed surface of the transparent plate, for pressing the transparent plate to the main casing.

2. The photoelectric sensor as defined in claim 1, further comprising:
    an end casing coupled to an end portion of the main casing along the first direction, and for holding the photoelectric element;
    a second opening formed on the end casing for passing through a light corresponding to the photoelectric element between the inside and outside of the end casing;
    a second surface formed on the end casing;
    a second adhesive member disposed between the transparent plate and the second surface of the end casing, for affixing the transparent plate on the second surface of the end casing whereby the transparent plate covers the second opening; and
    a second pressing member contacting an opposite side of the affixed surface of the transparent plate, for pressing the transparent plate to the end casing.

3. The photoelectric sensor as defined in claim 2, wherein an engage portion is formed on the second pressing member and engages the end casing so as to press the transparent plate to the end casing, and the second pressing member approaches the end casing along the optical axis of the light so as to engage the end casing.

4. The photoelectric sensor as defined in claim 2, wherein a pair of second projections is formed on the end casing along the pair of first projections continuously, and the pair of second projections projects to the outside of the end casing along to the optical axis of the light.

5. The photoelectric sensor as defined in claim 2, wherein a third projection is formed on an edge of the end casing, and the third projection projects to the outside of the end casing along the optical axis of the light, and a notch is formed on the third projection.

6. The photoelectric sensor as defined in claim 2, wherein the second pressing member overlaps the pair of first pressing member on the main casing.

7. An emitting device for a photoelectric sensor having an emitting element which irradiates a light, the emitting device for a photoelectric sensor comprising:
    a main casing in which a plurality of emitting elements are included along to a first direction;
    a first opening formed on the main casing for passing through a light corresponding to the emitting element between an inside and outside of the main casing;
    a transparent plate affixed on a pair of first surfaces of the main casing so as to cover the first opening, for passing through the light between the inside and outside of the main casing;
    a first adhesive member disposed between the transparent plate and the pair of first surfaces, for affixing the transparent plate on the pair of first surfaces;

a pair of projections formed on the main casing along the first direction, projecting along an optical axis of the light, and disposed apart from each other whereby the transparent plate assembles from outside of the main casing to the pair of first surfaces;

a pair of channels formed on the main casing along the first direction and between the pair of first surfaces and the pair of projections of the main casing; and a pair of first pressing members fixed in the pair of channels and contacting an opposite side of the affixed surface of the transparent plate, for pressing the transparent plate to the main casing.

* * * * *